US009776900B2

(12) United States Patent
Zou et al.

(10) Patent No.: US 9,776,900 B2
(45) Date of Patent: Oct. 3, 2017

(54) USE OF CELLULOSES IN SLUDGE DEWATERING, AND SLUDGE PRODUCTS THEREOF

(71) Applicant: Buckman Laboratories International, Inc., Memphis, TN (US)

(72) Inventors: Yong Zou, Chesterfield, MO (US); Philip M. Hoekstra, Cordova, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 285 days.

(21) Appl. No.: 14/592,922

(22) Filed: Jan. 9, 2015

(65) Prior Publication Data

US 2015/0197439 A1    Jul. 16, 2015

Related U.S. Application Data

(60) Provisional application No. 61/926,987, filed on Jan. 14, 2014.

(51) Int. Cl.
*B01D 21/01* (2006.01)
*C02F 1/52* (2006.01)
(Continued)

(52) U.S. Cl.
CPC ............ *C02F 11/14* (2013.01); *B01D 21/01* (2013.01); *C02F 1/5236* (2013.01); *C02F 1/56* (2013.01);
(Continued)

(58) Field of Classification Search
None
See application file for complete search history.

(56) References Cited

U.S. PATENT DOCUMENTS 5,827,398 A * 10/1998 Depasquale ........ D21H 23/765
162/164.1
2010/0096336 A1    4/2010 O'Reilly
(Continued)

FOREIGN PATENT DOCUMENTS

DE    4445702 A1    6/1995
GB    1009707 A     10/1965
(Continued)

OTHER PUBLICATIONS

Wagberg et al. (Langmuir, 2008, 24, 784-795).*
(Continued)

*Primary Examiner* — Clare Perrin
(74) *Attorney, Agent, or Firm* — Kilyk & Bowersox, P.L.L.C.

(57) ABSTRACT

Methods to improve dewatering in industrial and municipal sludges are described. One method involves admixing sludge from a papermaking process and modified cellulose to provide modified sludge with the modified cellulose present in an effective amount to improve dewatering in the treated sludge, such as in allowing use of reduced amounts of coagulant and/or reducing dewatering times, increased dewatered volumes, and reduced sludge product moisture contents, and the like. The dewatered sludge may be formed into a dried particulate, and may be used as filler or other component of concrete, rubber, asphalt, plastics, resin-wood composite products, and other composite products.

10 Claims, 4 Drawing Sheets

(51) Int. Cl.
<table>
<tr><td>B01D 37/00</td><td>(2006.01)</td></tr>
<tr><td>B01D 33/04</td><td>(2006.01)</td></tr>
<tr><td>B01D 33/048</td><td>(2006.01)</td></tr>
<tr><td>B01D 33/06</td><td>(2006.01)</td></tr>
<tr><td>C02F 11/14</td><td>(2006.01)</td></tr>
<tr><td>C08L 1/00</td><td>(2006.01)</td></tr>
<tr><td>C02F 1/56</td><td>(2006.01)</td></tr>
<tr><td>C02F 11/12</td><td>(2006.01)</td></tr>
<tr><td>D21C 5/00</td><td>(2006.01)</td></tr>
<tr><td>D21H 11/18</td><td>(2006.01)</td></tr>
<tr><td>D21H 17/01</td><td>(2006.01)</td></tr>
<tr><td>C02F 1/00</td><td>(2006.01)</td></tr>
<tr><td>B01D 33/00</td><td>(2006.01)</td></tr>
<tr><td>B01D 21/00</td><td>(2006.01)</td></tr>
<tr><td>B03D 3/00</td><td>(2006.01)</td></tr>
<tr><td>C08B 1/00</td><td>(2006.01)</td></tr>
<tr><td>C02F 103/28</td><td>(2006.01)</td></tr>
</table>

(52) U.S. Cl.
CPC ............... *C02F 11/12* (2013.01); *C08L 1/00* (2013.01); *D21C 5/00* (2013.01); *D21H 11/18* (2013.01); *D21H 17/01* (2013.01); *B01D 21/00* (2013.01); *C02F 2103/28* (2013.01); *C02F 2303/06* (2013.01); *C02F 2305/00* (2013.01)

(56) References Cited

U.S. PATENT DOCUMENTS

2012/0227920 A1* 9/2012 Juppo .................. D21H 21/10
162/164.6
2013/0180679 A1 7/2013 Laine et al.

FOREIGN PATENT DOCUMENTS

| JP | 57-130600 A | 8/1982 |
|---|---|---|
| WO | 2006060028 A1 | 6/2006 |
| WO | 2012156880 A1 | 11/2012 |
| WO | 2012156882 A1 | 11/2012 |

OTHER PUBLICATIONS

Written Opinion of the International Preliminary Examining Authority issued in corresponding International Patent Application No. PCT/US2015/010715, dated Jan. 4, 2016 (8 pages).

International Search Report and Written Opinion issued in corresponding Inernational Patent Application No. PCT/US2015/010715, dated Apr. 2, 2015 (11 pages).

"Paper-and Cardboard Industry" regarding "ARBOCEL", J. Rettenmaier & Sohne GmbH + Co KG, 2015, http://www.jrs.de/jrs_en/fiber-solutions/bu-chemie/anwendungen/papier-und-kartonindustrie/index.php (7 pages).

* cited by examiner

USE OF CELLULOSES IN SLUDGE DEWATERING, AND SLUDGE PRODUCTS THEREOF

This application claims the benefit under 35 U.S.C. §119 (e) of prior U.S. Provisional Patent Application No. 61/926,987, filed Jan. 14, 2014, which is incorporated in its entirety by reference herein.

BACKGROUND OF THE INVENTION

The present invention relates to processes for dewatering sludges, and more particularly relates to using cellulose in dewatering sludges and products that incorporate the sludges.

Sludges are generated in both municipal water treatment systems and industrial systems, such as papermaking mills.

In the pulp and papermaking industries, the conventional manufacture of paper, cardboard, and related paper products typically results in large quantities of papermaking sludge as a by product. Large paper mills may produce many tons of sludge per day. Pulp and paper sludge can be generated from both influent and effluent water treatment at paper mills, with the majority of sludge generated from effluent water treatment. Influent water treatment relates to clarification to remove suspended matter in large volumes of water that are to be used in the wet-end production process, with river water or other non-treated water being principal sources. Effluent water treatment relates to primary treatment to remove suspended matter in the effluent followed by secondary effluent treatment using biological systems. Typically solids from both the influent and effluent clarification are mixed with waste water sludge produced by secondary biological and chemical-flocculation processes. The combined sludge is conditioned with chemicals, thickened by mechanical methods, dewatered, and disposed of, primarily in a landfill or they are incinerated, or used as a recycled resource.

In more detail, the sludge by product in effluent water arises during papermaking in the following general manner. Paper is conventionally made by draining a low consistency slurry of cellulose fiber pulp, fillers (e.g., clay), and additives (e.g., calcium carbonate or other materials as retention aids, latex dyes, pigments, defoamers, mixing catalysts such as casein or soy protein, etc.) through a paper machine "wire" (essentially an endless mesh or sieve). A certain amount of solid material passes through the wire with the suspension water, and thus it is not retained in the wet paper web formed on the wire. The drained suspension water and suspended solid material is commonly referred to as "white water," and is reused as far as practicable. However, complete recovery and reuse of this water and papermaking raw materials is not feasible, and a certain proportion is discharged from the paper machine as a waste water stream. This waste water stream from the paper machine typically is treated before it can be discharged from the paper mill. This treatment normally involves passage of the waste water stream through a clarifier or into a settling tank in which heavier components settle to the bottom of the tank and are drawn off as "sludge". The settled sludge is commonly referred to as the primary sludge. The primary sludge is partly dewatered (e.g., mechanical pressing via a belt filter press, vacuum filter, or screw press), which partly reduces the water content, e.g., to approximately 50% to 80% water content, providing a quantity of sludge for final disposal. Dewatered primary sludges may be dried in a rotary drum dryer, and the like. A secondary source of sludge is comprised of those particles which are too small to settle in any reasonable length of time from the waste water stream during collection of the primary sludge. This overflow can receive a secondary biological treatment and the results of which can be bio-sludge, and the effluent from biotreatment can be chemically flocculated to provide a tertiary sludge. Mixed sludges are formed of combinations of these various sludges, such as primary and secondary sludges.

Papermaking sludges obtained from these sludges often contain large amounts of water, wood fibers, wood particles ("fines"), fillers, additives, together with miscellaneous debris such as grit, sand, plastic particles, dirt, and, particularly if waste paper has been used by the mill as a raw material, ink particles, accumulations of adhesives and other particles used in the paper making process. There is no precise composition for this sludge because there are substantial variations in the wood and other feedstocks used; in the processing materials which must be used to make different types of paper products; and even considerable variation in the processes used by different paper makers in making similar products. This sludge is known in the industry by a variety of names, including: "primary waste treatment sludge", "paper mill sludge", "process residual", "waste treatment sludge", "waste treatment plant ('WTP') sludge", to name a few. For simplicity, the term "papermaking sludge" is used herein to denote this product, or merely as "sludge."

Sludge also is generated in the treating of municipal waste waters, and industrial wastewaters besides papermaking. Flocculants often are used in forming such sludges, which are then dewatered by a physical process, such as decanter centrifuge, belt press, or filter press.

Many problems with sludge management are caused by the dewatering characteristics of sludge. In general, the sludge has poor mechanical dewaterability. The dewatering properties will vary depending on the type of sludge, with an acceptable dewaterability for primary sludge and very poor dewaterability for biological and chemical-flocculation sludge. The sludge needs to be dewatered before disposal or used as a recycled resource, or other further handling or use. High water content increases sludge disposal cost considerably and cause other problems.

The present inventors have recognized the need for improved dewatering methods and dewatering additives for sludges, such as industrial and municipal sludges.

SUMMARY OF THE INVENTION

A feature of the present invention is to provide methods to improve dewatering of sludge, such as industrial and municipal sludges. A further feature is to provide cellulose-modified sludges produced by these methods, and also composite products that incorporate the modified sludges.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purposes of the present invention, as embodied and broadly described herein, the present invention relates to a method for dewatering sludge, comprising a) mixing sludge and cellulose to provide modified sludge, wherein the sludge comprises solid material and water, and the cellulose comprises microfibrillated cellulose (MFC), nanofibrillated cellulose (NFC), microcrystalline cellulose (MCC), ultrafine cellulose (UFC), or any combination thereof, and b) at least partially dewatering the modified sludge.

The present invention further relates to method for dewatering sludge, comprising a) mixing sludge and cellulose to provide a modified sludge, wherein the sludge comprises solid material and water, and the cellulose comprises microfibrillated cellulose, nanofibrillated cellulose, microcrystalline cellulose, ultrafine cellulose, or any combination thereof, b) mixing the modified sludge with coagulant to provide a coagulated modified sludge, c) mixing the coagulated modified sludge with flocculant to provide a flocculated modified sludge; and d) at least partially dewatering the flocculated modified sludge to provide dewatered modified sludge.

The present invention further relates to a modified sludge which comprises a mixture including sludge and cellulose, wherein the cellulose comprises microfibrillated cellulose, nanofibrillated cellulose, microcrystalline cellulose, ultrafine cellulose, or any combination thereof. The sludge can be dewatered sludge which is obtained from a method of the present invention.

It is to be understood that both the foregoing general description and the following detailed description are exemplary and explanatory only and are only intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

The present invention relates to improved methods for dewatering sludges and similar materials, and the resulting modified sludges and products containing them.

One method involves admixing sludge from an industrial process or municipal waste, and modified cellulose to provide treated sludge with the modified cellulose present in an effective amount to improve dewatering in the treated sludge. The improved dewatering can comprise reducing dewatering times, increasing dewatered volumes, reducing sludge product moisture contents, allowing use of reduced amounts of coagulant and/or flocculant, increasing heat value of the sludge, and the like, or any combinations thereof. The celluloses are "modified" celluloses in that the material can modify one or more of these sludge dewatering performances and/or properties as compared to the sludge without the treatment. The dewatered sludge may be dried and particulated. The sludge products can be disposed or recycled, such as used as filler or other component of concrete, rubber, asphalt, plastics, resin-wood composite products, or in other composite products.

In the present invention, the modified cellulose can be used as an additive alone or in conjunction with coagulants and/or flocculants to improve efficiency of dewatering treatment of sludge, such as in industrial or municipal sludge treatments. The modified cellulose can be nanocellulose (microfibrillated cellulose-MFC, nanofibrillated cellulose-NFC, and microcrystalline cellulose-MCC), ultrafine cellulose (UFC), or any combinations thereof. The modified celluloses can be added to sludge in dry particulate form, as dispersed in a fluid carrier (such as a suspension, slurry, gel, or pulp, or other forms), or in any combinations thereof. The modified cellulose can be the only type of cellulose added for a sludge treatment or it can be added in combination with other types of cellulose that are different from the above-indicated modified celluloses.

Examples of the modified cellulose, such as MFC, NFC, MCC, and UFC, are shown in Table 1. Other structures and dimensional ranges may be used within the categories.

TABLE 1

|  | MFC | NFC | MCC | UFC |
|---|---|---|---|---|
| Structure | fibrils, or fibril bundles, or others. | fibrils, or fibril bundles, or others. | microcrystallites (microrods), or others. | particles, or others. |
| Length (L) | ≥1000 nm (1 μm), or 1 μm-1000 μm (1 mm), or > 1 μm, or 3 μm-900 μm, or 2 μm-500 μm or others. | <1000 nm, or 1 nm-999 nm, or 1 nm-900 nm, or 50 nm-500 nm, or 100 nm-200 nm, or others. | ≥1000 nm (1 μm), or 1 μm-1000 μm (1 mm), or > 1 μm, or 5 μm-900 μm, or 2 μm-500 μm, or 10 μm-750 μm or others. | — |
| Diameter (D) | <100 nm, or 1 nm-20 nm, or 1 nm-10 nm, or 3 nm-5 nm, or others. | <100 nm, or 1 nm-20 nm, or 1 nm-10 nm, or 3 nm-5 nm, or others. | <1000 nm, or 1 nm-1000 nm, or 1 nm-500 nm, or 1 nm-100 nm, or others. | 1 μM-25 μM, or 5 μM-15 μM, or 6 μM-10 μM, or about 8 μM, or others. |
| Aspect ratio (AR), L/D | ≥10/1, or ≥50/1, or ≥100/1, or ≥1000/1, 10/1-1000/1, or others. | ≥5/1, or ≥10/1, or ≥50/1, or ≥100/1, or ≥1000/1, 5/1-1000/1, or others. | ≥5/1, or ≥10/1, or ≥50/1, or ≥100/1, or ≥1000/1, or 5/1-1000/1, or others. | — |

Using the modified cellulose can allow for decreased dosage and improved efficiency in dewatering (e.g., by decreasing coagulant/flocculant dosage needs, increasing TTF (time to filter) filtrate volumes), reducing moisture in final sludge, and the like, as compared to sludge treatments without the cellulose. In treatment of sludge from pulp and paper mills or other industrial processes (e.g., petroleum refinery effluent, tannery plant, industrial surface treatments, and the like), preferably the sludge can receive initial treatment with the modified cellulose prior to coagulation/flocculation treatments, which can give even better results. The modified celluloses have been found to increase dewatering rates of sludges, such as papermaking sludges or other sludges, when sludges are subjected to the dewatering step in sludge processing, such as from a centrifuge, belt press, screw presses, or other devices that removes water from papermaking sludges. The addition of the modified cellulose in sludge dewatering not only can improve the process efficacy, but also can improve heat value of the dewatered sludge. The method of using modified cellulose in the dewatering of sludge in methods of the present invention can be expanded to re-use of waste water and sludge within an industrial production facility, or waste water and sludge by other subsequent users. The modified cellulose is a renewable, biodegradable, "green" material (which means improved safety in application), and stable product for industry without harmful by-product, which can reduce environmental issues during manufacturing, applying, end use, or re-use.

Using methods of the present invention, time to filter (TTF) free drainage volume can be increased at least 5%, or at least 10%, or at least 15%, in the dewatering of a sludge modified with the cellulose compared to a sludge that is unmodified with the modified cellulose. Moisture content of the dewatered modified sludge can be at least 10 wt % less, or at least 15% less, or at least 20% less, less than that of dewatered sludge that is unmodified with the modified cellulose. The heat value of the dewatered modified sludge can be at least 10% greater than, or at least 15% greater than, or at least 20% greater than that of dewatered sludge that is unmodified with the modified cellulose. These improvements can be enhanced with combined treatment of sludge with the cellulose and coagulant and/or flocculant treatment. Time to filter (TTF) free drainage volume can be increased at least 5%, or at least 10%, or at least 15%, in the dewatering of a coagulated and/or flocculated sludge that has been modified with modified cellulose compared to a sludge that is unmodified with the modified cellulose and treated with the coagulant and the flocculant. The moisture content of the dewatered cellulose-modified sludge can be at least 10 wt % less, or at least 15% less, or at least 20% less, as compared to dewatered sludge that is unmodified with the cellulose and treated with the coagulant and the flocculant. A heat value of the dewatered modified sludge can be at least 10% greater than, or at least 15% greater than, or at least 20% greater than that of dewatered cellulose-modified sludge that is unmodified with the modified cellulose and treated with coagulant and flocculant. A dosage of the coagulant and/or flocculant used on the sludge modified with the cellulose can be reduced by at least 10%, or at least 15%, or at least 25%, compared to a dosage used on sludge that is unmodified with the modified cellulose and treated with the coagulant and/or flocculant, and provide at least the same weight percentage of water removal from the sludge.

Sludges that can respond to treatment with the modified cellulose are not specifically limited and can include primary sludges, secondary sludges, tertiary sludges, and all mixtures of primary, secondary and/or tertiary sludges, or other sludges. Sludges that contain the modified cellulose can be dried and used as a filler material or other component in composite products, such as concrete, rubber, asphalt, plastics, resin wood composites (e.g., as admixed with binder and lignocellulosic material and heat cured/molded to form resin wood composites such as engineered wood products).

The expression "cellulose" can refer to any types of cellulose, such as cellulose fibers (cellulose material), which contain modified cellulose at least in part. As indicated, a modified cellulose improves (modifies) dewatering performance on sludge and/or heat value or other sludge properties as compared to the sludge without the modified cellulose. Preferably, the modified cellulose is nanocelluloses, ultrafine celluloses, or combinations of both types. Nanocelluloses can refer to microfibrillated cellulose (MFC), nanofibrillated cellulose (NFC), microcrystalline cellulose (MCC), or any combinations thereof. The nanocelluloses can be a charged material, such as anionic. The nanocelluloses can have high aspect ratio, high surface area, high adsorption capacity, and useful mechanical properties, and they are renewable, biodegradable green materials.

Microfibrillated cellulose (MFC) can refer to cellulose comprising microfibrils, e.g., a set of isolated cellulose microfibrils or microfibril bundles derived from cellulose raw material which, for purposes of this application, are differentiated from nanocelluloses at least based on fibril length dimension. Cellulose fibers contain microfibrils that are filamentous constituents of cellulose fibers. A cellulose fiber is made fibrous by fibrillating. The aspect ratio (length/diameter) of microfibrils is typically high; the length of individual microfibrils can be more than one micrometer (μm) and the diameter (e.g., number average) can be less than one micrometer and typically less than 100 nm, such as less than 20 nm. The dimensions and structures of microfibrils or microfibril bundles depend on the raw material and the manufacturing method. As indicated, microfibrillated celluloses can be very thin in diameter, such as less than 100 nm, or other values, and have a length of at least 1 μm for purposes of how the terminology is used herein. The microfibrillated cellulose materials can be comprised of micro-size-class fibrils having a diameter of from about 1 nm to about 10 nm, and a length within the μm class (≥1 μm and ≤1 mm), such as from about 1 μm to 500 μm, or other dimensions. The diameter and length values indicated herein can be average values for a number of fibrils in the category, or absolute values that apply to all fibrils in the category.

Microfibrillated fibers can be made using known methods. Microfibrillated cellulose may be formed from any botanical raw material, e.g. wood-based raw material, such as hardwood raw material or softwood raw material, or other botanical raw material that contains cellulose. Botanical raw materials may include e.g. agricultural waste, grasses, straw, bark, caryopses, peels, flowers, vegetables, cotton, maize, wheat, oat, rye, barley, rice, flax, hemp, abaca, sisal, kenaf, jute, ramie, bagasse, bamboo or reed or different combinations thereof.

Microfibrillated cellulose may also contain hemicellulose, lignin and/or extractive agents, the amount of which depends on the employed raw material. Microfibrillated cellulose is isolated from the above-described raw material containing cellulose with an apparatus suitable for the purpose, e.g. a grinder, comminutor, homogenizer, fluidizer, micro- or macrofluidizer, cryo crushing and/or ultrasonic disintegrator. Microfibrillated cellulose may also be obtained directly by a fermentation process using microorganisms. Microfibrillated cellulose may be any chemically or physically modified derivative of cellulose having microfibrils or microfibril bundles. Chemical modification may be based e.g. on a carboxy-methylation, oxidation, esterification and etherification reaction of cellulose molecules. The modification may also be carried out by physical adsorption of anionic, cationic or non-ionic materials or combinations thereof to the surface of cellulose. The modification may be performed before, during, or after the manufacture of microfibrillated cellulose. Microfibrillated cellulose may be formed by any manner known per se in the art from cellulose-based raw material. A mixture composition containing microfibrillated cellulose can be formed from dried and/or concentrated cellulose raw material by fibrillating. The cellulose raw material can be concentrated. The cellulose raw material can be dried. The cellulose raw material can be dried and concentrated. The cellulose raw material can be chemically preprocessed to disintegrate more easily, i.e. labilized, whereby the mixture composition containing microfibrillated cellulose is formed from chemically labilized cellulose raw material. For example, a N-oxyl (e.g. 2,2,6,6-tetramethyl-1-piperidine N-oxide) mediated oxidation reaction provides very labile cellulose raw material which is exceptionally easy to disintegrate into microfibrillated cellulose. This type of chemical pre-processing is described for example in WO 09/084566, which is incorporated in its entirety herein.

Nanofibrillated cellulose (NFC) can be a material comprised of nanosized cellulose fibrils with a high aspect ratio (length to width ratio). As indicated, NFC is differentiated from MFC for purposes of this application primarily based on the fibril lengths. The nanofibrillated cellulose material can be comprised of nanosize-class fibrils, the diameter of which can be less than 100 nm, and the length within the nm class (≤1000 nm). The nanofibrillated cellulose material preferably can have nanosize scale dimensions of from about 1 to about 20 nm wide (diameter), or other values, and from about 50 nm to about 500 nm long, or other dimensions, such as 3-5 nm wide and 100-200 nm in length, or other dimensions. A preferred nanofibrillated fibril may be about 100-200 nm in length and about 3-5 nm wide, or other dimensions, and comprise a small bundle of the cellulose strands tightly bound together. The nanocellulose source materials and methods used to produce nanofibrillated cellulose can overlap with those indicated for producing microfibrillated cellulose. These approaches generally can include chemical delignification, mechanical diminution, chemical diminution, fermentation, and dissolution or different combinations of them, or other approaches. Nanofibrillated celluloses may be commercially obtained, such as a NFC suspension ARBOCEL® MF40-10 from J. Rettenmaier & Sohne GMBH Co., Germany, or other sources.

Ultrafine cellulose (UFC) is a cellulose-derived product which can have a small particle size with a major dimension (diameter) of about 5-15 μm, such as about 8 μm, or other values. UFC can be made from renewable material. Ultrafine cellulose may be commercially obtained, such as ARBOCELL® UFC-100 from JRS Inc., USA. Ultrafine cellulose is shown in WO 2006/034837, which is incorporated in its entirety herein.

Microcrystalline cellulose (MCC) is purified, partially depolymerized cellulose. MCC preferably can have particle sizes in the micrometer-class of from 1 μm up to about 1000 μm, such as from about 5 μm to about 900 μm, or from about 10 μm to about 750 μm, or other values. MCC can be obtained and used in different grades. Powder grade MCC can be obtained from highly purified pulp by depolymerization of the pulp to provide cellulose microcrystallites (microrods), which can be dried to form powder grade MCC. Colloidal grade MCC can be produced by mixing the cellulose microcrystallites with carboxymethylcellulose sodium and drying the mixture. MCC may be commercially obtained, such as the CEOLUS™ MCC products from Asahi Kasei, Japan.

The modified cellulose, such as MFC, NFC, MCC, and/or UFC, may be obtained and used in dry particulate form or as suspended or otherwise dispersed in a carrier fluid. Modified cellulose can be used in methods and sludge treatments of the present application as a combination of two or more of MFC, NFC, MCC, and/or UFC, and in any mixing proportions. A mixture of MFC and NFC may be used wherein the modified cellulose comprises fibrils having nanometer-sized diameters (<1000 nm) and a portion of the fibrils have lengths in the nanometer range (<1000 nm) and another portion has lengths in micrometer range (≥1000 nm). Other combinations of the various nanocelluloses and/or UFC may be used.

Other nanocelluloses may be used, such as nanocrystalline cellulose (NCC) or others. NCC is a more crystalline form of nanocellulose. NCC is generally referred to as cellulose nanowhiskers. Nanocrystalline cellulose (NCC) can be extracted from lignocellulosics by acidic hydrolysis extraction methods resulting in the formation of nanodimensional cellulose crystallites with a very high surface to volume ratios. The NCC can be in the form of highly crystalline and rigid nanoparticles. The NCC may be commercially obtained as NCC-FP, from FP Innovations in Quebec, Canada, and NCC-Alb, from Alberta Innovates in Alberta, Canada.

A portion of the cellulose used may be a type of cellulose that is not a modified cellulose. The different types of cellulose may be carboxymethylated cellulose, synthetic polymer fibers, fibers made from dissolving pulp, or other forms of cellulose. The cellulose may be present in the form of pulp, which may be chemical pulp, mechanical pulp, thermomechanical pulp or chemi(thermo)mechanical pulp or a kraft pulp. The pulp may be pulp from hardwood, softwood, or both types, or may comprise textile fibers, agricultural plant pulp, and the like. The cellulose may be bleached or unbleached.

The cellulose added for a sludge treatment can contain a total amount of the modified cellulose of at least about 5 wt %, at least 10 wt %, or at least 20 wt %, or at least 30 wt %, or at least 40 wt %, or at least 50 wt %, or at least 60 wt %, or at least 70 wt %, or at least 80 wt %, or at least 90 wt %, or at least 95 wt %, or at least 99 wt %, or from about 5 wt % to 100 wt %, or from about 10 wt % to about 99 wt %, or from about 20 wt % to about 95 wt %, or from about 50 wt % to 100 wt %, or from about 80 wt % to 100 wt %, or from about 90% to 100 wt %, or other amounts, based on the total amount of cellulose used or to be used as a treatment additive for sludge.

As indicated, in treating a sludge for improving dewatering or other benefits in a method of the present invention, the modified cellulose can be added by itself as a dry particulate, or as dispersed in a fluid carrier, such as a suspension, slurry, gel, or pulp, or other forms. The carrier can be aqueous (water), an organic solvent, or mixtures of different organics solvents and/or water. An organic solvent may be an alcohol, such as isopropanol, ethanol, glycol, polyethylene glycol, acetone, and the like, or any combinations thereof. The modified cellulose can be dispersed in dilute or concentrated forms in a liquid. The amounts of modified cellulose in a carrier liquid may be from about 1 wt % to about 99 wt %, or from about 5 wt % to about 90 wt %, or from about 25 wt % to about 75 wt %, or other amounts, based on the solids content of the modified cellulose and the total weight of the fluid and all additives. As indicated, other types of cellulose, such as longer non-fibrillated cellulose fibers, may be included. Preferably, the modified cellulose comprises the predominant amount of cellulose used with respect to other types of cellulose, such as in the above-indicated percentages. The temperature of any fluid used to disperse the cellulose preferably is kept between the freezing and boiling points of the fluid, and may be room or ambient temperature or other temperatures.

Although the effective amount of cellulose may vary, depending on the sludge composition and conditions, the cellulose can be added in an amount of from about 10 g to about 400 g (or more) per ton of sludge on a dry solids weight basis, or from about 20 g to about 200 g per ton of sludge on a dry solids weight basis, or from about 40 g to about 400 g per ton of sludge on a dry solids weight basis, or other amounts. The sludge can contain at least about 0.1 weight %, such as from about 0.01 weight % to about 0.4 weight %, or from about 0.04 weight % to about 0.1 weight %, total cellulose, or other amounts, on a cellulose solids: total sludge solids basis, to provide dewatering improvements. These amounts of cellulose can be based on the amount of modified cellulose.

The cellulose comprising modified cellulose may be used alone or in combination with other additives used in sludge treatment. It may be introduced into the sludge at a single point or in multiple points, in a continuous or non-continuous manner. It may, for example, be introduced into a process stream using a metering pump, or it may be gravity fed. When referring herein to cellulose addition, the addition can entail addition of the cellulose separately into the process apparatus, or in combination with another feed-stream fed to the same apparatus, or both. For example, the sludge and cellulose may be combined with primary effluent drawn from a settling tank where the sludge is being collected at a paper mill, or some other convenient location upstream of a coagulation/flocculation reactor and dewatering devices. The modified cellulose can be added at the coagulation/flocculation reactor. Alternatively, the modified cellulose may be combined with the sludge in an RST (rotary screw thickener). For example, the paper mill can use an RST to partially dewater the sludge before it is fed into a screw press or belt press for further dewatering. Coagulants and/or flocculants can be added to a feed tank before the RST to encourage fast dewatering. The cellulose can be added at the top of the feed tank after the coagulant or flocculant is added. As indicated, if a coagulant and flocculant is used at the coagulation/flocculation reactor, the coagulant usually is added first in a first stage of processing, followed by addition of flocculant in a second stage of processing. Agitation conditions can be varied depending on whether the coagulation or flocculation stage is being performed. Typically, coagulation is performed under higher agitation conditions, whereas flocculation is performed under more gentle stirring conditions so as not to break up flocs. This can allow enough contact time with the modified cellulose to encourage the release of more water in the RST. The modified cellulose can also be added directly, by gravity feed or such as by direct injection in the case of suspensions, slurries or gels, into the screw press after the first consolidation zone, which would still allow admixing of the cellulose throughout the sludge. Most screw presses are 30 feet or longer in length and have access points during the consolidation where a tap can be installed to inject a cellulose-containing fluid into the sludge. At the end of the screw press, the dewatered sludge can fall off the screw into a hopper where it can be collected.

The cellulose comprising modified cellulose can be added earlier, such as at a primary clarifier, as indicated above. This introduction site may use a higher dosage of modified cellulose generally in view of the large volume of waste material still being handled and under treatment at that location. The modified cellulose can be combined with sludge or sludge containing material after the primary clarifier, before the screw press, and/or during dewatering in the screw press, although not limited thereto. As indicated, the combined presence of modified cellulose and coagulant and/or flocculant can enhance dewatering performance on the sludge. Modified cellulose with coagulant and/or flocculant, can be added to sludge or effluent before and/or during a chemical coagulation and/or flocculation process performed on the material. The resulting sludge can be dewatered more efficiently than a sludge resulting from the process without use of modified cellulose. Preferably, the sludge is combined with the modified cellulose before addition of a coagulant to obtain better dewatering results. The sludge, primary or mixed, that has optionally been treated with a coagulant and/or a flocculant, can be dewatered (dried) in several stages of processing. For example, the sludge is initially partly dewatered on a dewatering device or devices to provide a thickened sludge, and then the thickened sludge is further processed in a screw press to provide a cellulose-treated dry sludge as an extrudate. Various types of dewatering devices or apparatuses can be used alone or in combination with each other to dewater the sludge or flocculated sludge in particular. For example, the dewatering apparatus applied to the sludge upstream of the screw press can include a gravity table, a belt press, a gravity table and belt press, a rotary screen thickener, a rotary vacuum drum, a centrifuge, and so forth.

As referenced herein, coagulation can involve the destabilization of colloids by neutralizing the forces that keep them apart. For instance, cationic coagulants provide positive electric charges to reduce the negative charge (zeta potential) of the colloids. As a result, the particles can collide to form larger particles (flocs). Rapid mixing typically is used to disperse the coagulant throughout the liquid. Care must be taken not to overdose the coagulants as this can cause a complete charge reversal and restabilize the colloid complex. The flocs may not be visible to the naked eye (e.g., microflocs). Flocculation can be the action of polymers to form bridges between the flocs, and bind the particles into large agglomerates or clumps. Flocculation can increase the particle size of the floc to form visible suspended particles. Bridging can occur when segments of the polymer chain adsorb on different particles and help particles aggregate. For instance, an anionic flocculant can react against a positively charged suspension, adsorbing on the particles and causing destabilization either by bridging or charge neutralization. In flocculation, the flocculating agent should be added by slow and gentle mixing to allow for contact between the small flocs and to agglomerate them into larger particles. The newly formed agglomerated particles are quite fragile and can be broken apart by shear forces during mixing. Care must also be taken to not overdose the polymer as doing so can cause settling/clarification problems. For instance, anionic polymers themselves are lighter than water. As a result, increasing their dosage can increase the tendency of the floc to float and not settle. Once suspended particles are flocculated into larger particles, they can usually be removed from the liquid by sedimentation, provided that a sufficient density difference exists between the suspended matter and the liquid. Such particles can also be removed or separated by media filtration, straining or floatation. When a filtering process is used, the addition of a flocculant may not be required since the particles formed by the coagulation reaction may be of sufficient size to allow removal. The flocculation reaction not only can increase the size of the floc particles to settle them faster, but also can affect the physical nature of the floc, making these particles less gelatinous and thereby easier to dewater.

The coagulant can be a tannin-based ammonium salt, ferric sulfate, ferric chloride, aluminum sulfate (alum), polyaluminum chloride (PAC), sodium aluminate, polyferric sulfate, aluminum chlorohydrate, polyaluminum silicate chloride, epichlorohydrin dimethylamine copolymer (epi-DMA), diallyldimethylammonium chloride (DADMAC), polyamines, melamine formaldehyde resin, polyethylenimine, or any combination thereof. The coagulant can be obtained from a commercial source, such as BUBOND® 2620, and BUBOND® 5828, from Buckman International Laboratories, Memphis Tenn., USA. The coagulant can be added in an amount of from about 0.1 to about 20 pounds (lbs.) per ton (2000 lbs.) of sludge, or from about 0.25 to about 15 pounds per ton of sludge, or from about 0.5 to about 10 pounds per ton of sludge, or from about 1 to about 9 pounds per ton of sludge, or from about 1.75 to about 8 pounds per ton of sludge, or from about 6 to about 10 pounds per ton of sludge, or other amounts, on a dry solids weight basis. The coagulant can be added to sludge in an amount of from about 10 to about 1000 ppm, or from about 25 to about 750 ppm, or from about 50 to about 500 ppm, or from about 75 to about 300 ppm, or from about 100 to about 200 ppm, or other amounts, on a dry solids weight basis.

The flocculant can be a polyacrylamide polymer, polyethyleneimine, polyamide-amine, polyamine, polyethylene oxide, sulfonated compound, starch derivative, polysaccharide, alginate, activated silica, colloidal clay, alum, ferric hydroxide, and the like, or any combination thereof. The flocculant can be obtained from a commercial source, such as BUFLOC® 5116, from Buckman International Laboratories. The polyacrylamide can be a high molecular weight ionically charged polyacrylamide. The flocculant can carry active groups with a charge which can counterbalance charge of the particles. Sludges which contain a high proportion of colloidal organic substances may not be suitable for direct flocculation, and can be coagulated to destabilize the sludge before flocculation treatment. The flocculant can be added in an amount of from about 0.1 to about 40 pounds per ton of sludge, or from about 0.5 to about 30 pounds per ton of sludge, or from about 1 to about 25 pounds per ton of sludge, or from about 1.5 to about 20 pounds per ton of sludge, or from about 1.75 to about 15 kg per ton of sludge, or from about 12 to about 18 pounds per ton of sludge, or other amounts, on a dry solids weight basis. The flocculant can be added to sludge in an amount of from about 10 to about 1500 ppm, or from about 25 to about 1000 ppm, or from about 50 to about 750 ppm, or from about 100 to about 500 ppm, or from about 200 to about 300 ppm, or other amounts, on a dry solids weight basis.

As indicated, primary sludges, secondary sludges, or mixed sludges combining both of these types of sludges, and/or tertiary sludges, can be treated with cellulose comprising modified cellulose in accordance with the present invention. A papermaking sludge which can be treated in a method of this present invention can be obtained from any commercially available source. It may be recovered from the papermaking process by the paper mill itself or obtained from a paper mill off-site for use with the process, or obtained from another industrial or municipal waste water operation. If obtained from a paper mill, the composition of the papermaking sludge may vary depending upon the particular paper making process, although it typically will include, amongst other things, relatively fine wood fibers and inorganic fillers. Preferably, the sludge to be treated contains no more than 50% by weight moisture.

Where papermaking sludge is the sludge that is treated by a method of the present invention, the solid content of a papermaking sludge can vary with the source of the paper and the particular paper being manufactured. The solid component of the sludge generally comprises clay, cellulosic fibers, calcium carbonate and small quantities of casein, proteins, starch, latex dyes, defoamers and/or titanium dioxide. One non-limiting example of papermaking sludge contains, on a solids basis, about 40% by weight clay, about 30% by weight cellulosic fibers, about 19% by weight calcium carbonate, about 5% by weight casein, protein and starch, about 5% by weight latex dye and defoamers, and about 1% by weight titanium dioxide. The cellulosic fibers present in the sludge before treatment with cellulose according to methods of the present invention can comprise virgin cellulosic fibers, recycled cellulosic fibers, synthetic fibers, or any combination thereof. The virgin fibers can originate from, for example, from bleached kraft softwood pulp, bleached kraft hardwood pulp, bleached kraft fluff pulp, unbleached kraft softwood pulp, unbleached kraft hardwood pulp, bleached sulfite softwood pulp, bleached chemi-thermomechanical softwood pulp, bleached chemi-thermomechanical hardwood pulp, bleached sulfite softwood pulp for melamine, or combinations thereof. The reclaimed fibers can originate from, for example, old corrugated containers (OCC), old newspapers (ONP), old magazines (OMG), mixed office waste (MOW), sorted office paper (SOP), and combinations thereof. Colloidal pigments brought into the sludge by the papermaking waste may be, for example, calcium carbonate, silicates, calcined kaolin, hydrous kaolin, China clay, talc, mica, dolomite, silica, zeolite, gypsum, satin white, titania, titanium dioxide, calcium sulfate, barium sulfate, aluminum trihydrate, lithopone, blanc fixe, plastic pigment, or combinations thereof. Protein particulate brought into the sludge from the papermaking waste may comprise, for example, legume particles, powders, and/or flours. Other papermaking additives brought into the sludge by the papermaking waste may include, for example, latex binders, latex dyes, preservatives, pH-adjusters, levelling agents, lubricants, defoamers, wetting agents, optical brighteners, pigment-dispersing agents, cross-linkers, water retention aids, viscosity modifieds or thickeners, and combinations thereof. As indicated, the modified cellulose used in the treatment of sludge as part of a method of the present invention can become part of the composition of the dewatered sludge. The modified cellulose can change properties of the dewatered sludge, such as in heat value, moisture content, and the like, as compared to the sludge if dewatered without the presence/use of the modified cellulose.

A "sludge" can refer to residue separated from water recovered from an industrial waste water (commercial or experimental scale) or municipal waste water, in which the residue is in the form of a semisolid mass that is free or essentially free of solid particles buoyantly suspended in liquid (e.g., <1 wt % buoyantly suspended particles of total particles). A "papermaking sludge" can refer to such a sludge recovered from a paper making process (commercial or experimental scale).

Modified cellulose treatment of papermaking sludges are shown herein with reference to FIGS. 1-4 for sake of illustration with it being understood that the invention can have wider applicability that can include other sludges, such as other industrial sludges and municipal wastewater sludges, and the like.

Figure 1:
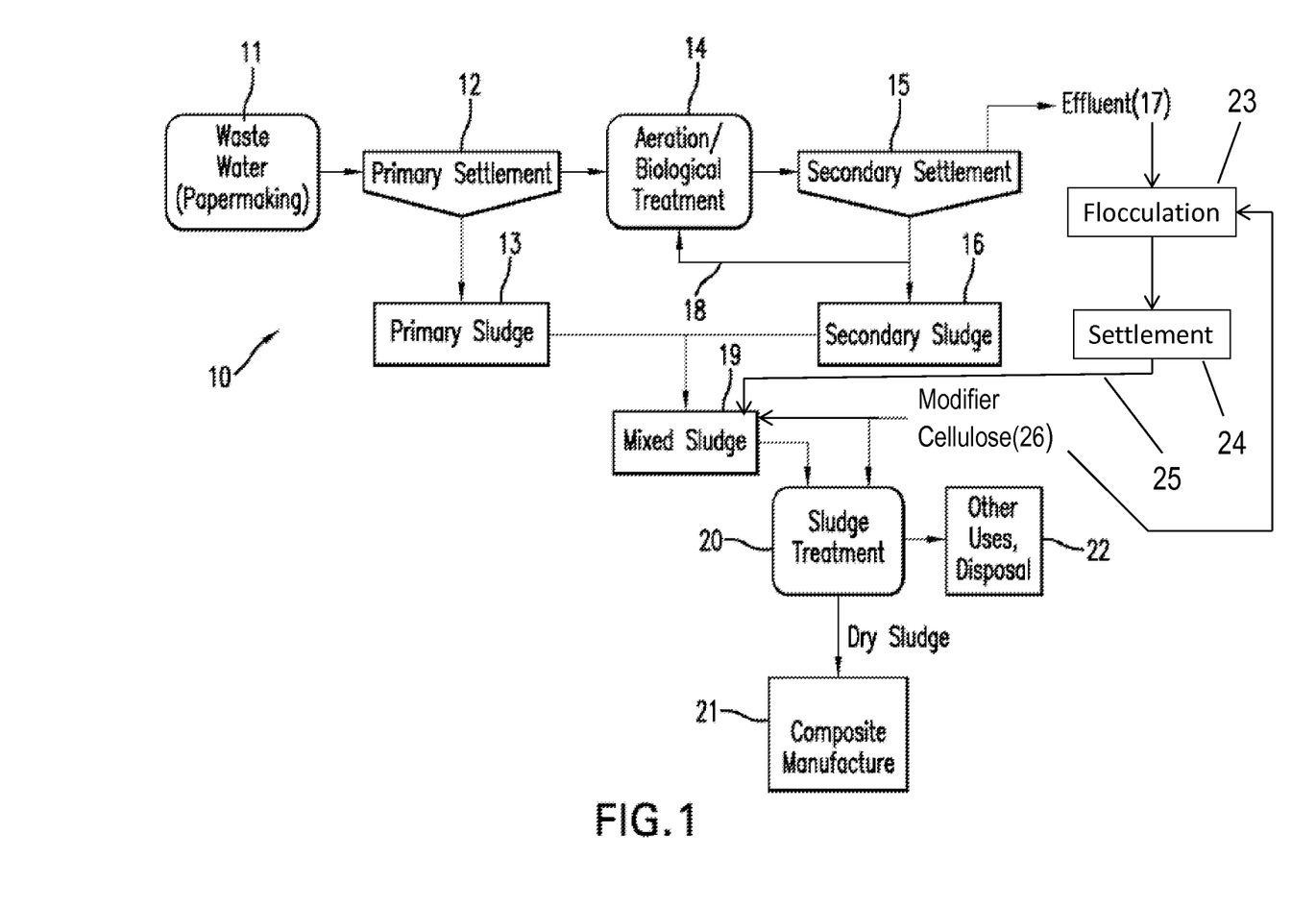
FIG. 1 illustrates a general process flow diagram for introducing cellulose to a sludge treatment according to an example of the present invention.

Referring to FIG. 1, in the illustrated process (10), papermaking sludge is collected and treated with modified cellulose effective to provide a modified dry sludge. Some portion of the modified cellulose can be incorporated into the sludge product such that the sludge is compositionally different than if it had not been treated with the modified cellulose. Primary treatment of the papermaking waste water (11) can involve discharging the waste water into a primary settling tank or clarifier (12). The water containing suspended solids then can be allowed to remain in the settling tank for a period of time (detention time) sufficient to permit the solid particulates to gravitationally settle to the bottom of the tank as sludge. This sludge can be periodically or continuously removed from the bottom of the tank as primary sludge (13). Secondary sludge (16) can be generated from the use of specially provided decomposers to break down remaining organic material in wastewater after primary treatment. The active agents in these systems are micro-organisms, mostly bacteria, which need the available organic matter to grow. There are various generally known techniques for secondary sludge processing, such as activated sludge, bacterial beds, lagooning, and filtration or biofiltatration. In activated sludge, for example, bacteria are kept in suspension in a vessel (14) in aerobic conditions. After treatment in this manner, the treated water can be decanted off in a secondary clarifier (15) to separate fluid effluent (17) from activated sludge (16), which settles out in the secondary clarifier. The primary and secondary sludges described above can be combined to provide mixed sludge (19). A portion of the activated sludge (18) may be used to reseed the biological treatment (14). The fluid effluent (17) decanted from the secondary clarifier (15) may be used to generate tertiary sludge (25), such as to remove remaining unwanted nutrients such as nitrogen and phosphorus, using chemical processes (e.g., chemical-flocculation processes) (23) or bacterial processes and settlement (24). The tertiary sludge (25) can be included in mixed sludges treated in accordance with this invention. Although not shown, the sludges also can be transformed into digested sludges by generally known techniques before cellulose and dewatering treatments of the sludge. As indicated in FIG. 1, the mixed sludge can be fed to a "sludge treatment" section (20) of the process (10). Modified cellulose (26) can be added to the mixed sludges before the sludge treatment (20) which includes dewatering of the sludge, and/or added during dewatering of the mixed sludges during the sludge treatment (20) and before it is completed, or in conjunction with the flocculation treatment (23), or at other locations, or in combinations thereof. The dry sludge obtained from the sludge treatment (20) can be used in the production of composite products, such as concrete, rubber, asphalt, plastics, shaped engineered composite wood products (21), or other products or uses, or can be landfilled for stable disposal (22).

Figure 2:
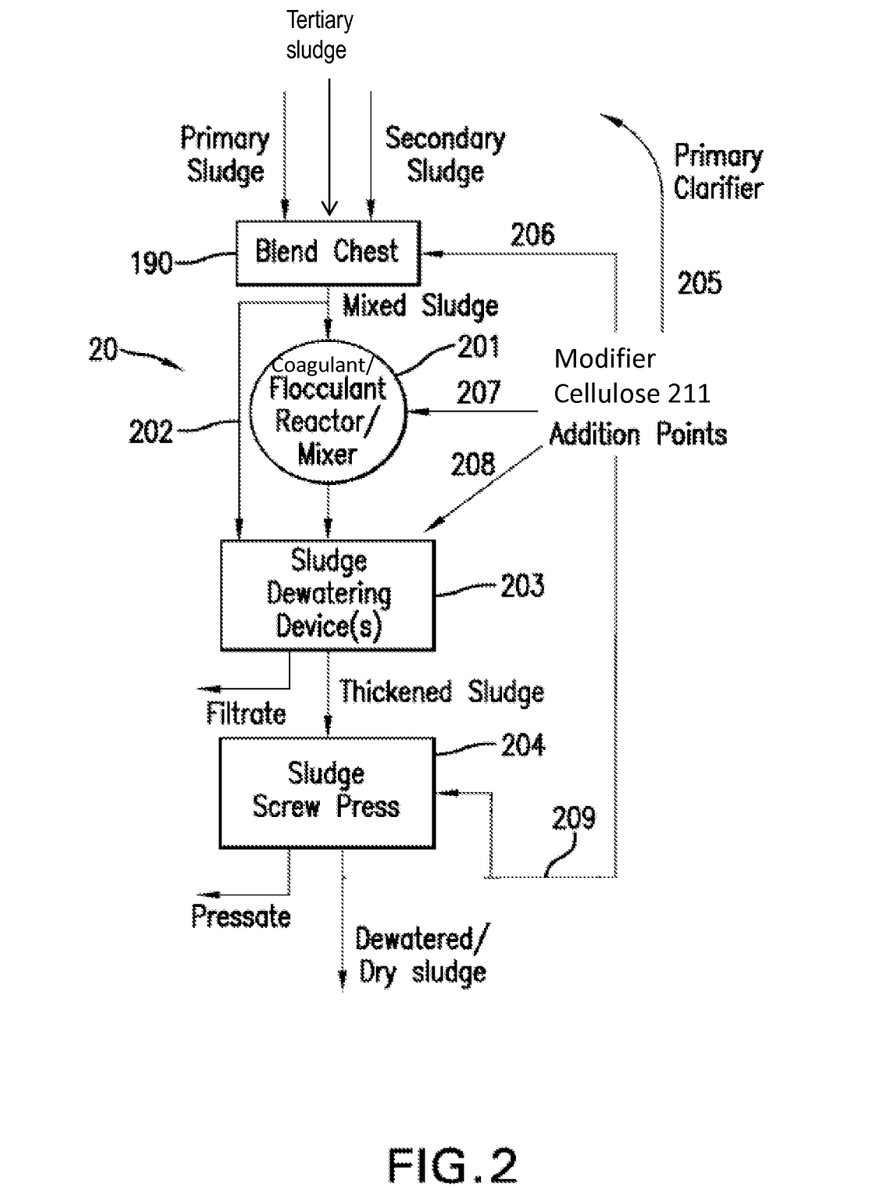
FIG. 2 illustrates a general process flow diagram of the sludge treatment shown in FIG. 1 according to an example of the present invention.

Referring to FIG. 1 and FIG. 2, the mixed sludge (19) can be formed at a blend chest (190) from which the mixed sludge can be conducted to "sludge treatment" section (20) of process (10). As shown in FIG. 2, the sludge treatment section (20) is illustrated as a series of process steps and stations including optional coagulant and/or flocculant addition in a mixer/reactor (201) (or bypass thereof via line (202) from blend chest (190)), sludge dewatering comprising dewatering section (203) and sludge screw pressing section (204), to yield dry sludge. Modified cellulose (211) can be introduced at one or more of numerous different addition locations (205)-(209) within the process. In general, for purposes of improving dewatering of the sludge, the cellulose can be introduced before or during sludge treatment, or in combinations thereof. For example, before the sludge treatment, cellulose can be introduced before sludge treatment at the clarifier (12), shown by (205), or at the blend chest (190), shown by (206). During sludge treatment, the modified cellulose (211) can be added at the flocculant reactor (201), shown by (207), or at the sludge dewatering device(s) (203), shown by (208). The modified cellulose optionally can be added within the screw press (204), shown by (209). The combined use of modified cellulose and coagulant and/or flocculant can enhance dewatering efficiency on the sludge.

Referring further to FIG. 2, a step of promoting coagulation and/or flocculation in the sludge can be carried out in mixer/reactor (201) by essentially any technique known in the art. The step of promoting the formation of flocs can be performed by adding one or more coagulants and/or flocculants to the sludge. If a coagulant and flocculant is used at the coagulation/flocculation reactor, addition is preferably sequential, with the coagulant preferably added first in a first stage of processing, followed by addition of flocculant in a second stage of processing. These coagulation and flocculation stages may be sequentially performed in non-overlapping time periods with respect to each other. Suitable coagulants and/or flocculants for treatment of sludge are indicated infra and can include those generally known in the art, and may be selected based, for example, on the particular sludge materials being processed. The coagulated and/or flocculated sludge that is fed on to the dewatering device(s) (203) may have a consistency and texture similar to "wet cement." The step of adding the modified cellulose to the sludge can be done before, during, or after the sludge undergoes coagulation and/or flocculation. Preferably, modified cellulose can be added before pre-treatment of the sludge with a coagulant and/or flocculant. The modified cellulose retains its dewatering efficacy even where added before coagulation/flocculation. The sludge may have modified cellulose added and transported directly from the blend chest (201) to sludge thickening device(s) (203), as indicated by process bypass flow path (202) in FIG. 2, without any intervening coagulation and/or flocculation treatment before dewatering and screw pressing.

Figure 3:
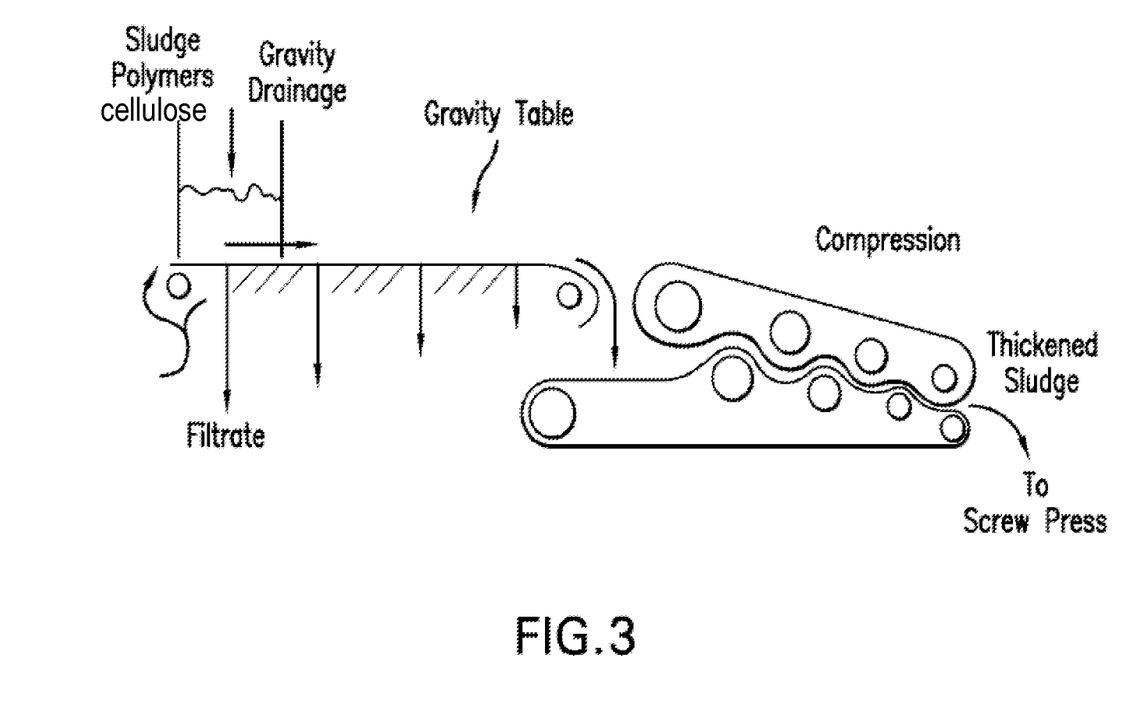
FIG. 3 illustrates sludge dewatering according to an example of the present invention.

Referring to FIG. 2 and FIG. 3, a method of sludge dewatering to form thickened sludge from modified cellulose-treated sludge can involve the passage of the treated sludge onto a gravity table that forms part of a belt press for gravity drainage. The sludge is then transferred from the gravity table to a belt press for additional dewatering. In general, two opposed traveling belts gradually come together along a sludge treatment zone. Sludge is squeezed and carried along the opposed belt surfaces. Water drains out of the squeezed sludge for drainage through the lowermost belt. As indicated above, the gravity table or belt press alone alternatively could be used for the dewatering device (204). Another type of dewatering apparatus involves passage of the treated sludge through a porous medium under a vacuum operating force. The medium can be located on a rotary drum that has a sludge inlet connected to the drum interior. The vacuum draws water outwardly through the filtering medium, leaving a filter cake of sludge on the interior surface of the drum. Pressure filtration can also be used to remove water from the sludge. Filter cloths are supported on frames arranged in a parallel array. Sludge under pressure enters spaces between the frames in such a manner that clear filtrate passes through the various cloth panels, the dewatered sludge collecting as a filter cake on the cloth panels. Centrifugal separation techniques can be used for dewatering sludge. The sludge is fed into a rotating bowl, where the sludge collects on the interior surface of the bowl, water exiting through an opening in the end wall of the bowl. Finally, a helical blade scrapes the filter cake from the bowl surface. Illustrative commercial equipment vendors of these types of dewatering devices include, for example, Alfa Laval and Siemens. The amount of dewatering and thickening achieved at dewatering device (203) can vary depending on a variety of factors, such as the sludge composition, choice of dewatering device and operational conditions thereof, and so forth.

Figure 4:
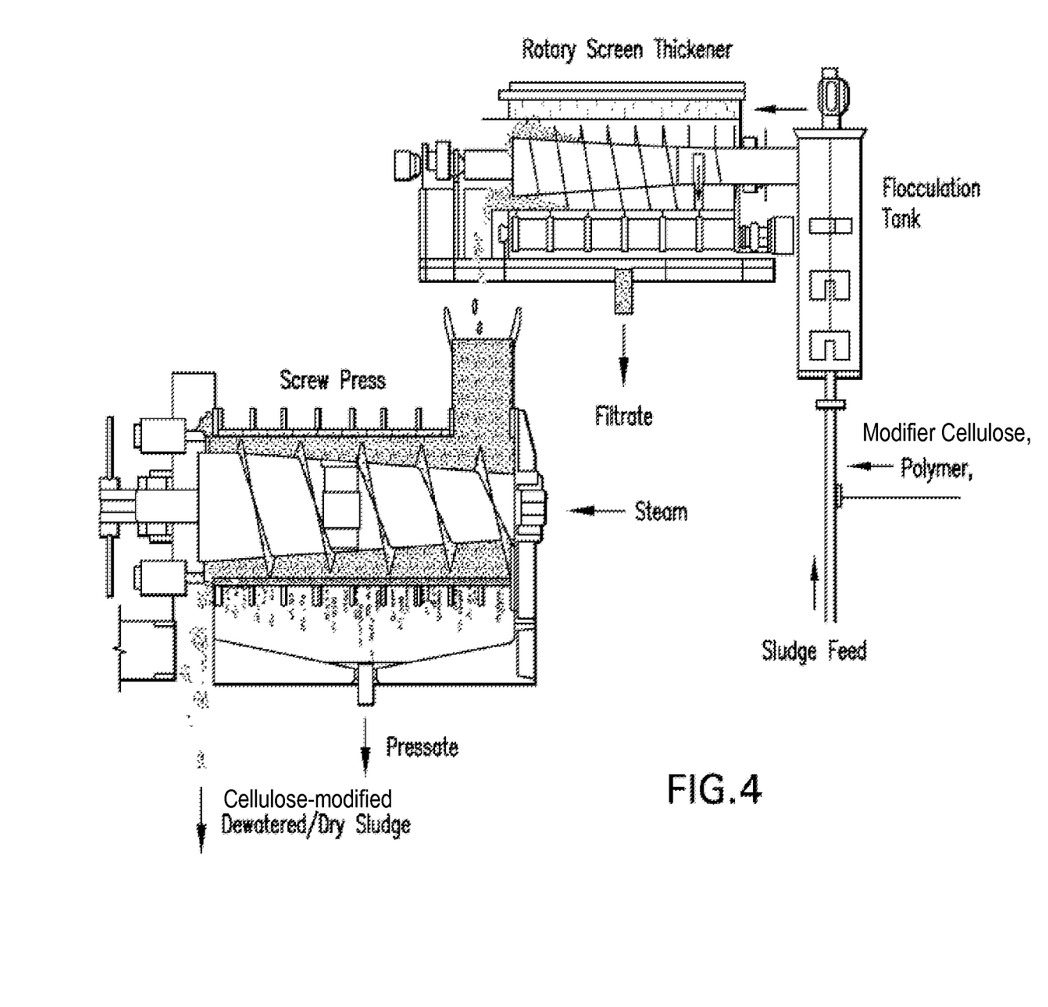
FIG. 4 illustrates sludge dewatering according to another example of the present invention.

Referring to FIG. 4, in an alternative option, modified cellulose and coagulant and/or flocculant (e.g., coagulant/flocculant "polymer") treated sludge can be dewatered by a rotary screen thickener before the partly dewatered sludge is fed into the head box of a screw press for additional dewatering and pressing. The screen press includes fighting for conveying sludge underpressure from the head box to the discharge outlet. Steam is introduced into the device as illustrated in FIG. 4. The dry or dewatered sludge that is discharged from the screw press has the texture of a fluffy extrudate. It not a wet cake. The dry sludge discharged from the screw press comprises unsuspended solids with a total moisture content of no more than about 60 wt. %, particularly no more than about 50 wt. %, more particularly no more than about 45 wt. %, and even more particularly no more than about 35 wt. %. The sludge discharged from the screw press can be predominantly solids (total) on a weight percentage basis (≥50%), and thus no more than 50 wt. % total moisture. For purposes herein, "moisture" refers to water. The rotary screen thickener and screw press can have conventional constructions used in pulp and paper sludge dewatering or thickening applications. Illustrative commercial equipment vendors of these types of equipment include, for example, FKC Co., Ltd. However, these dewatering devices are not previously known to have been applied to dewatering and pressing of sludges treated with cellulose in accordance with the present invention.

The cellulose-treated sludge discharged from the screw press or other final dewatering device may be dried and comminuted to provide a dry flowable particulate form of the material. Drying can be done, for example, with a gas-fired dryer. Comminuting can be done, for example, with a mill, such as a hammer mill. That is, the cellulose-treated papermaking sludge may tend to form into relatively large lumps having a moisture content substantially above that acceptable for further processing, such as heat-pressing or molding, or concrete addition, such as discussed below. Accordingly, the modified cellulose-treated papermaking sludge preferably is further dried to a moisture content in the order of about 20 weight % or less, such as from about 4 to about 10 weight % or from 1 weight % to 15 weight %, based on the dry weight of the solids, and comminuted in a suitable device, such as a mill (e.g., hammer mill), prior to the blending step. The moisture content to which the papermaking sludge is dried depends primarily upon the particular type of resin being used as discussed below. During the comminuting step, the papermaking sludge preferably is broken down into a size not substantially larger than the individual wood fibers therein. If the moisture content of the papermaking sludge is less than about 15 weight %, the sequence of the drying and comminuting steps can be reversed if desired and the drying step can be eliminated for papermaking sludges having a moisture content less than about 10 weight %. While the particle size of the comminuted papermaking sludge is not particularly critical, the average size generally can be from about 32 to about 200 screen mesh, or other sizes. These moisture contents and particulate sizes can apply to other sludges treated by methods of the present invention and are not restricted to papermaking sludges.

The dried form of cellulose-treated sludge can be conveniently and stably stored, transported, handled, and subsequently used, such as in a composite product manufacture incorporating the treated sludge as an ingredient thereof. The dried cellulose-treated papermaking sludge can be used as a filling material or other component in the manufacture of concrete, rubber, asphalt, plastics, resin-wood fiber composites or engineered fiber composites, or other composite products.

The present invention includes the following aspects/embodiments/features in any order and/or in any combination:

1. A method for dewatering sludge, comprising a) mixing sludge and cellulose to provide modified sludge, wherein the sludge comprises solid material and water, and the cellulose comprises microfibrillated cellulose (MFC), nanofibrillated cellulose (NFC), microcrystalline cellulose (MCC), ultrafine cellulose (UFC), or any combination thereof, and b) at least partially dewatering the modified sludge.

2. The method of any preceding or following embodiment/feature/aspect, wherein the microfibrillated cellulose (MFC), nanofibrillated cellulose (NFC), microcrystalline cellulose (MCC), ultrafine cellulose (UFC) comprises at least 10 wt % by weight of all cellulose used in said method.

3. The method of any preceding or following embodiment/feature/aspect, wherein the microfibrillated cellulose (MFC), nanofibrillated cellulose (NFC), microcrystalline cellulose (MCC), ultrafine cellulose (UFC) comprises from about 90 to 100 wt % by weight of all cellulose used in said method.

4. The method of any preceding or following embodiment/feature/aspect, wherein the cellulose is anionic.

5. The method of any preceding or following embodiment/feature/aspect, wherein the cellulose is added in an amount of from about 10 g to about 400 g per ton of sludge on a dry solids weight basis.

6. The method of any preceding or following embodiment/feature/aspect, further comprising coagulating the modified sludge before the dewatering or flocculating the modified sludge before the dewatering, or both.

7. The method of any preceding or following embodiment/feature/aspect, wherein time to filter (TTF) free drainage volume is increased at least 5% in the dewatering of the modified sludge compared to a sludge that is unmodified with the cellulose.

8. The method of any preceding or following embodiment/feature/aspect, wherein moisture content of the dewatered modified sludge is at least 10 wt % less than that of dewatered sludge that is unmodified with the cellulose.

9. The method of any preceding or following embodiment/feature/aspect, wherein heat value of the dewatered modified sludge is at least 10% greater than that of dewatered sludge that is unmodified with the cellulose.

10. A method for dewatering sludge, comprising:
a) mixing sludge and cellulose to provide a modified sludge, wherein the sludge comprises solid material and water, and the cellulose comprises microfibrillated cellulose, nanofibrillated cellulose, microcrystalline cellulose, ultrafine cellulose, or any combination thereof;

b) mixing the modified sludge with coagulant to provide a coagulated modified sludge;

c) mixing the coagulated modified sludge with flocculant to provide a flocculated modified sludge; and d) at least partially dewatering the flocculated modified sludge to provide dewatered modified sludge.

11. The method of any preceding or following embodiment/feature/aspect, wherein the microfibrillated cellulose (MFC), nanofibrillated cellulose (NFC), microcrystalline cellulose (MCC), ultrafine cellulose (UFC) comprises at least 10 wt % by weight of all cellulose used in said method.

12. The method of any preceding or following embodiment/feature/aspect, wherein the microfibrillated cellulose (MFC), nanofibrillated cellulose (NFC), microcrystalline cellulose (MCC), ultrafine cellulose (UFC) comprises from about 90 to 100 wt % by weight of all cellulose used in said method.

13. The method of any preceding or following embodiment/feature/aspect, wherein the cellulose is anionic.

14. The method of any preceding or following embodiment/feature/aspect, wherein steps a), b), and c) are performed sequentially in non-overlapping time periods.

15. The method of any preceding or following embodiment/feature/aspect, wherein the cellulose is added in an amount of from about 10 g to about 400 g per ton of sludge on a dry solids weight basis.

16. The method of any preceding or following embodiment/feature/aspect, wherein the coagulant is a tannin-based ammonium salt, ferric sulfate, ferric chloride, aluminum sulfate (alum), polyaluminum chloride (PAC), sodium aluminate, polyferric sulfate, aluminum chlorohydrate, polyaluminum silicate chloride, epichlorohydrin dimethylamine copolymer (epi-DMA), diallyldimethylammonium chloride (DADMAC), polyamines, melamine formaldehyde resin, polyethylenimine, or any combination thereof.

17. The method of any preceding or following embodiment/feature/aspect, wherein the flocculant is polyacrylamide polymer, polyethyleneimine, polyamide-amine, polyamine, polyethylene oxide, sulfonated compound, starch derivative, polysaccharide, alginate, activated silica, colloidal clay, alum, ferric hydroxide, or any combination thereof.

18. The method of any preceding or following embodiment/feature/aspect, wherein time to filter (TTF) free drainage volume is increased at least 5% in the dewatering of the flocculated modified sludge compared to a sludge that is unmodified with the cellulose and treated with the coagulant and the flocculant.

19. The method of any preceding or following embodiment/feature/aspect, wherein moisture content of the dewatered modified sludge is at least 10 wt % less than that of dewatered sludge that is unmodified with the cellulose and treated with the coagulant and the flocculant.

20. The method of any preceding or following embodiment/feature/aspect, wherein heat value of the dewatered modified sludge is at least 10% greater than that of dewatered sludge that is unmodified with the cellulose and treated with coagulant and flocculant.

21. The method of any preceding or following embodiment/feature/aspect, wherein a dosage of the coagulant used on the sludge modified with the cellulose is reduced by at least 10% compared to a dosage used on sludge that is unmodified with the cellulose and treated with the coagulant and flocculant, and provide at least the same weight percentage of water removal from the sludge.

22. The method of any preceding or following embodiment/feature/aspect, wherein the sludge is industrial sludge or municipal sludge.

23. The method of any preceding or following embodiment/feature/aspect, wherein the sludge is papermaking sludge or pulp mill sludge.

24. The method of any preceding or following embodiment/feature/aspect, wherein the dewatering comprises dewatering the flocculated modified sludge on a dewatering device that is gravity table, belt press, rotary screen thickener, or any combination thereof.

25. A modified sludge comprising a mixture including sludge and cellulose, wherein the cellulose comprises microfibrillated cellulose, nanofibrillated cellulose, microcrystalline cellulose, ultrafine cellulose, or any combination thereof.

26. The modified sludge of any preceding or following embodiment/feature/aspect, wherein the admixture is in a dried particulate form.

27. The modified sludge of any preceding or following embodiment/feature/aspect, comprising a solids content of at least about 85 weight percent.

28. The modified sludge of any preceding or following embodiment/feature/aspect, wherein the sludge is in a dried form containing less than about 20 wt % moisture.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be purely exemplary of the present invention, in which parts are proportions by weight unless otherwise specified.

EXAMPLES

Example 1

Dewatering treatment tests were performed to study the effects of modified cellulose on sludge with coagulant/flocculation treatments on free drainage and turbidity.

With respect to the materials used, the sludge was obtained from a commercial paper mill. As coagulants, BUBOND® 2620 and BUBOND® 5828 were used. As flocculant, BUFLOC® 5116 was used. The modified celluloses were microfibrillated cellulose (MFC), obtained from the University of Maine; microcrystalline cellulose (MCC), such as CEOLUS™ MCC, which was obtained from Asahi Kasei, Japan; and ultrafine cellulose (UFC), obtained as ARBOCELL® UFC-100 from JRS Inc., USA.

With respect to the method of the studies, a free drainage test was performed in a 1000 ml jar which was loaded with 500 ml of the sludge, and then (a) first, adding coagulant-mixing four times (changing from one jar to another similar jar), and (b) second, adding coagulant or flocculant and mixing ten times (changing from one jar to the other jar). For MFC, UFC-100 and MCC, in most cases, MFC (UFC-100, or MCC) was added first, then coagulant was added, and then flocculant was added at last. TTF volumes (ml) were measured at 60 seconds by weight (balance), and 10, 20, 30 second values were all estimated. The measurement of drained volumes for a given time period, instead of the time to drain a given volume, can be done as a modified version of the TTF test using Method 2710H of Standard Methods (APHA et al., 1992).

In these tests, BUBOND® 5828 dosage was 8 lbs./ton (120 ppm). The dosages used in the tests for BUBOND® 2620, BUFLOC® 5116MFC, MFC, MCC, and UFC are indicated in Table 2. The stirrer used was a 4-Stirrer Model 7790-100. Turbidity was measured using a 2100 P Turbidimeter (HACH).

Results of the tests are shown in Table 2. The abbreviation "5828" refers to BUBOND® 5828, "2620" refers to BUBOND® 2620, and "5116" refers to BUFLOC® 5116.

TABLE 2

| | FREE DRAINAGE TEST TTF (Time to Filter) (mL) | | | | |
|---|---|---|---|---|---|
| | 10 sec | 20 sec | 30 sec | 60 sec | TURBIDITY (NTU) |
| 5828 | 170 | 194 | 220 | 240.31 | 8 |
| MFC (6 ppm) + 5828 | 190 | 216 | 228 | 243.77 | 9 |
| 5116 + MFC (6 ppm) | 160 | 190 | 210 | 233.49 | 9 |
| 2620 | 150 | 176 | 200 | 224.28 | 7 |
| MFC (6 ppm) + 2620 | 160 | 184 | 210 | 232.13 | 9 |
| MFC (3 ppm) + 5828 | 172 | 200 | 222 | 241.71 | 9 |
| MFC (6 ppm) + 5828 | 192 | 220 | 232 | 245.44 | 9 |
| MFC (12 ppm) + 5828 | 185 | 210 | 224 | 242.07 | 10 |
| UFC (6 ppm) + 5828 | 192 | 218 | 228 | 243.49 | 11 |
| UFC (12 ppm) + 5828 | 198 | 220 | 232 | 247 | 11 |
| MCC (6 ppm) + 5828 | 188 | 218 | 226 | 243.57 | 11 |
| MCC (12 ppm) + 5828 | 168 | 190 | 210 | 235.42 | 10 |

Note:
Flocculant-Bulfoc 5116: dosage is 225 ppm, the other chemicals dosage are all 120 ppm BUBOND® 5828 was used. As flocculant, BUFLOC® 5116 was used. The modified cellulose used in these tests was ultrafine cellulose (UFC), obtained as ARBOCELL® UFC-100 from JRS Inc., USA.

With respect to the method of the studies, a free drainage test was performed in a 1000 ml jar which was loaded with 500 ml of the sludge, and (a) first, adding UFC-100, then coagulant BUBOND® 5828—mixing four times (changing from one jar to another similar jar), and (b) second, adding flocculant and mixing ten times (changing from one jar to the other jar). TTF volumes (ml) were measured at 60 seconds by weight (balance), and 10, 20, 30 second values were all estimated. The measurement of drained volumes for a given time period can be done as indicated in Example 1.

In these tests, the dosage of BUBOND® 5828 and BUFLOC® 5116 are indicated in Table 3. The stirrer used was similar to that indicated in Example 1. Turbidity was measured using a 2100 P Turbidimeter (HACH).

Results of the tests are shown in Table 3. The abbreviation "5828" refers to BUBOND® 5828, and "5116" refers to BUFLOC® 5116. In Table 3, the abbreviation "First" refers to a process sequence of first adding UFC in the indicated ppm value before adding coagulant. The abbreviation "After 5828" refers to a process sequence of adding UFC in the indicated ppm value after adding the indicated coagulant. The abbreviation "mixed" in Table 3 refers to adding the UFC as a mixture with the indicated coagulant in the respective indicated ppm amounts. An empty box in Table 3 indicates no data.

TABLE 3

| Effect of ultrafine cellulose on coagulant for sludge dewatering | | | | | | | | | |
|---|---|---|---|---|---|---|---|---|---|
| | | | | Free Drainage Test (ml-TTF) | | | | TURBIDITY (NTU) | |
| Run | UFC (ppm) | 5828 (ppm) | 5116 (ppm) | 10 sec | 20 sec | 30 sec | 60 sec | 1 hr | Overnight |
| 1 | 0 | 0 | 0 | 12 | 18 | 22 | 33.39 | 52 | |
| 2 | 0 | 0 | 225 | 48 | 64 | 74 | 93.52 | | 16 |
| 3 | 0 | 120 | 225 | 68 | 88 | 96 | 134.43 | 14 | 8 |
| 4 | 6-First | 120 | 225 | 80 | 108 | 118 | 151.46 | 21 | 9 |
| 5 | 6 (After 5828) | 120 | 225 | 82 | 110 | 119 | 156.21 | 33 | 9 |

It can be seen from the results in Table 2 that (a) modified cellulose (MFC, MCC and UFC) has increased TTF volume for both BUBOND® 2620 and BUBOND® 5828-sludge dewatering; (b) the adding point of modified cellulose can affect the result. The modified cellulose performs better when added before a coagulant; and (c) there can be an optimal dosage of the modified cellulose to obtain a maximum TTF volume under the particular conditions and materials used in this study. In these tests, a dosage of 6 ppm for MFC provided maximum TTF volume.

Example 2

Dewatering treatment tests were performed to study the effects of ultrafine cellulose as modified cellulose on sludge with coagulant/flocculation treatments on free drainage and turbidity.

With respect to the materials used, the sludge was obtained from a commercial paper mill. As coagulant, It is shown from the test results in Table 3 that (a) 6 ppm UFC increases TTF volume (~14% at 1 minute) of coagulant BUBOND® 5828 (dosage 120 ppm); (b) UFC cannot be mixed together with coagulant BUBOND® 5828; (c) UFC initially increases the Turbidity of filtered water, but it is almost the same after standing overnight.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for dewatering sludge, comprising:
  a) mixing sludge and cellulose to provide a modified sludge, wherein the sludge comprises solid material and water, and the cellulose comprises microfibrillated cellulose, nanofibrillated cellulose, microcrystalline cellulose, ultrafine cellulose, or any combination thereof;
  b) mixing the modified sludge with coagulant to provide a coagulated modified sludge;
  c) mixing the coagulated modified sludge with flocculant to provide a flocculated modified sludge; and
  d) at least partially dewatering the flocculated modified sludge to provide dewatered modified sludge.

2. The method of claim 1, wherein the microfibrillated cellulose (MFC), nanofibrillated cellulose (NFC), microcrystalline cellulose (MCC), ultrafine cellulose (UFC) comprises at least 10 wt % by weight of all cellulose used in said method.

3. The method of claim 1, wherein the microfibrillated cellulose (MFC), nanofibrillated cellulose (NFC), microcrystalline cellulose (MCC), ultrafine cellulose (UFC) comprises from about 90 to 100 wt % by weight of all cellulose used in said method.

4. The method of claim 1, wherein the cellulose is anionic.

5. The method of claim 1, wherein the cellulose is added in an amount of from about 10 g to about 400 g per ton of sludge on a dry solids weight basis.

6. The method of claim 1, wherein the coagulant is a tannin-based ammonium salt, ferric sulfate, ferric chloride, aluminum sulfate (alum), polyaluminum chloride (PAC), sodium aluminate, polyferric sulfate, aluminum chlorohydrate, polyaluminum silicate chloride, epichlorohydrin dimethylamine copolymer (epi-DMA), diallyldimethylammonium chloride (DADMAC), polyamines, melamine formaldehyde resin, polyethylenimine, or any combination thereof.

7. The method of claim 1, wherein the flocculant is a polyacrylamide, polyethyleneimine, polyamide-amine, polyamine, polyethylene oxide, a sulfonated compound, a starch derivative, a polysaccharide, alginate, activated silica, colloidal clay, alum, ferric hydroxide, or any combination thereof.

8. The method of claim 1, wherein the sludge is industrial sludge or municipal sludge.

9. The method of claim 1, wherein the sludge is papermaking sludge or pulp mill sludge.

10. The method of claim 1, wherein the dewatering comprises dewatering the flocculated modified sludge on a dewatering device that is gravity table, belt press, rotary screen thickener, or any combination thereof.

* * * * *